United States Patent

Stavropoulos

[11] 3,853,043
[45] Dec. 10, 1974

[54] BEVERAGE MAKER

[76] Inventor: Napoleon Stavropoulos, 3011 Edwin Ave., Fort Lee, N.J. 07024

[22] Filed: Apr. 26, 1973

[21] Appl. No.: 354,888

[52] U.S. Cl. .................... 99/306, 99/305, 99/299
[51] Int. Cl. .............................................. A23f 1/08
[58] Field of Search ............ 99/279, 299, 300, 304, 99/305, 306, 317

[56] References Cited
UNITED STATES PATENTS

| | | | |
|---|---|---|---|
| 1,983,142 | 12/1934 | Moriya | 99/306 |
| 2,052,476 | 8/1936 | Koch | 99/306 |
| 2,234,397 | 3/1941 | Bentz | 99/306 |
| 3,361,052 | 1/1968 | Weber | 99/299 |

Primary Examiner—Harvey C. Hornsby
Assistant Examiner—Robert Pous
Attorney, Agent, or Firm—Popper, Bain, Bobis, Gilfillan & Rhodes

[57] ABSTRACT

A beverage maker providing superimposed chambers for brewing, for distributing hot water, and as a reservoir of hot water; selective discharge orifices at the bottom of the reservoir regulate the flow of hot water from the reservoir into the distributor; multiple nozzles in the bottom of the distributor and a cloth distribute the hot water from the distributor to the brewer; and a screen in the brewer holds the coffee suspended above the floor for contact with the hot water and discharge from the bottom of the brewer into a cup.

1 Claim, 7 Drawing Figures

PATENTED DEC 10 1974 3,853,043
SHEET 2 OF 2

BEVERAGE MAKER

BACKGROUND OF THE INVENTION

1. Field of the Invention

This invention relates generally to beverage brewers, and particularly to beverage brewers providing means for regulating critically the flow of hot water from a reservoir into a distributor and on to a bed of coffee in a brewing chamber.

2. Prior Art

Coffee makers have been devised in numerous forms, wherein the concern for distributing the hot water on the coffee for extracting the coffee essence and brewing the coffee has been primarily concerned with the rapidity with which the hot water passes through the bed of coffee. Concern has sometimes been directed toward uniform distribution of flow of hot water over the surface of the coffee bed. At other times, the coffee maker has been devised so as to drastically control the flow of hot water onto the coffee bed.

It has been found that a more satisfactory brew of coffee can be attained wherein the rate of flow of hot water is carefully controlled insofar as the rate at which it is discharged into a distributor. Furthermore, the area of distribution is so carefully regulated as to provide for uniform distribution of the hot water over the entire exposed area of the coffee in the brewer. The first control is effected by the choice of one of several discharge orifices leading from the reservoir. The second control is effected by a uniform field of distribution from a distributor into a brewer. Beyond that the control of the brew is a further factor of penetration of the hot water through a bed of coffee and a supporting stainless steel mesh. The thickness of the bed of coffee is the critical factor in determining the strength of the brew, in combination with the rate of hot water flow from the reservoir into the distributor and from the distributor itself to the brewer. By regulation of flow, desired, preselected extraction of coffee essence is attained without bitterness or acidity.

DRAWINGS

These objects and advantages as well as other objects and advantages may be attained by the device shown by way of illustration in the drawings in which.

PREFERRED EMBODIMENT

Figure 1:
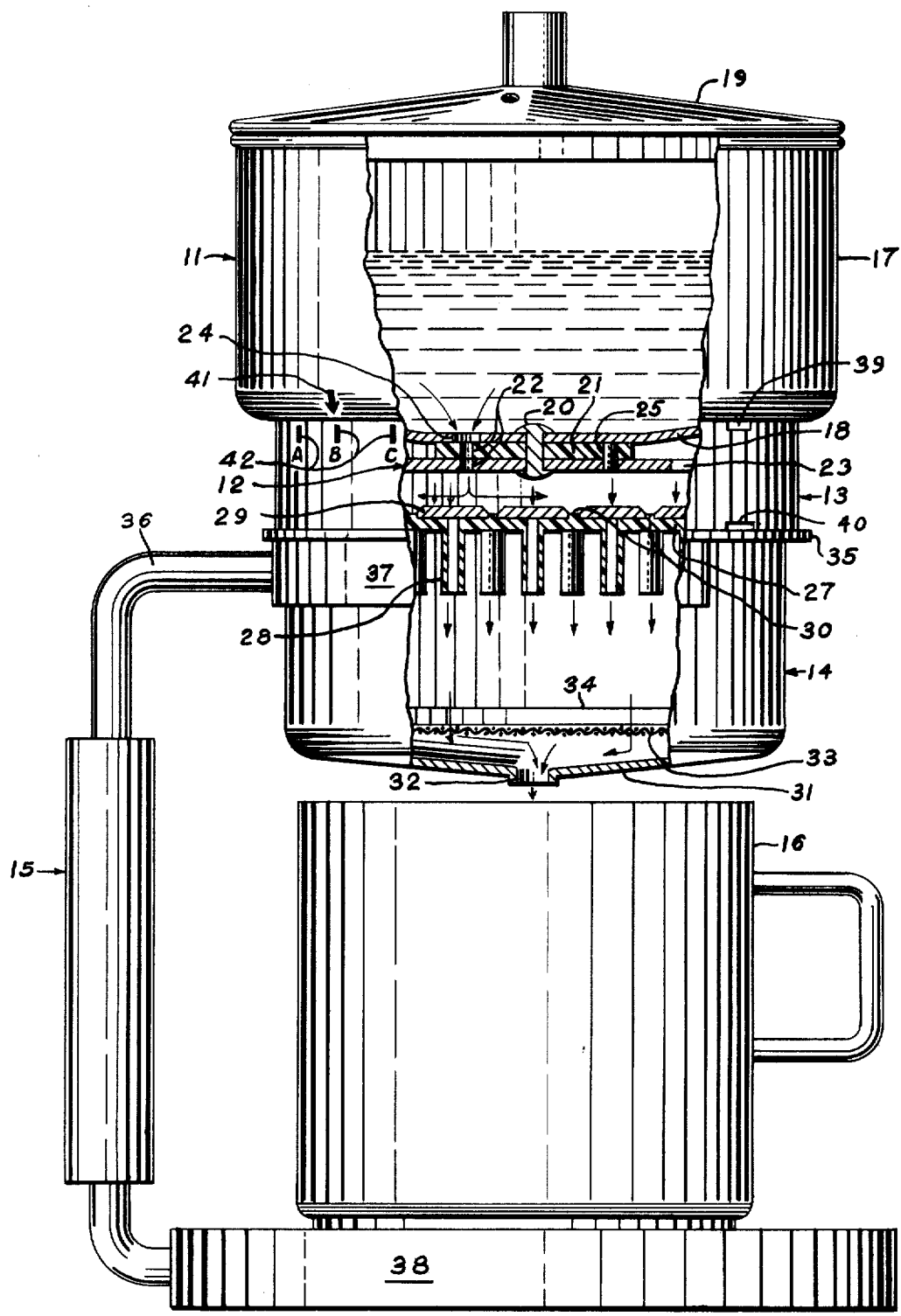
FIG. 1 is a partially sectioned vertical elevational view of the beverage maker including positions of the underlying distributor, brewer and selector plate.
Figure 2:
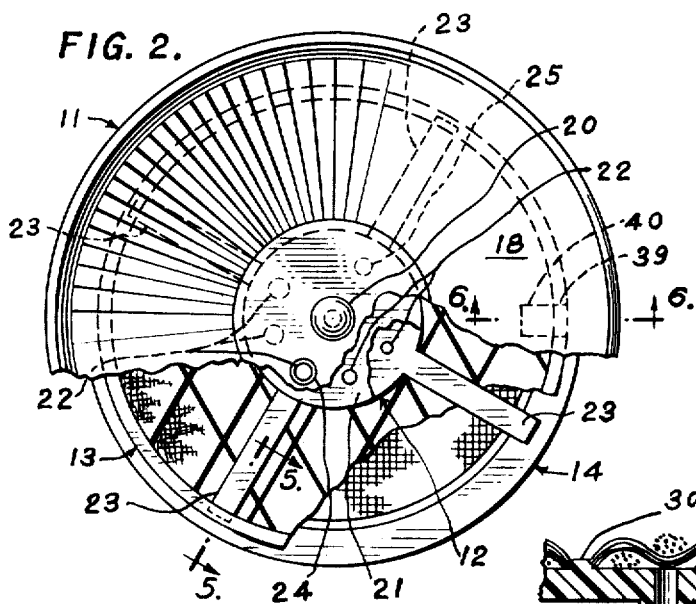
FIG. 2 is a top plan view of the interior of a hot water reservoir partially sectioned to show underlying parts.
Figure 3:
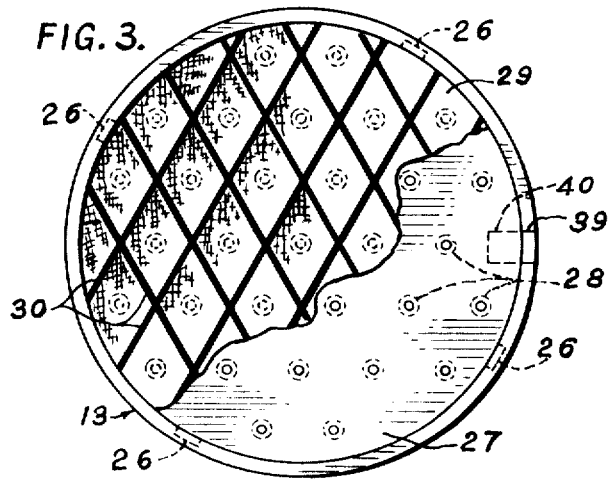
FIG. 3 is a top plan view of the distributor.
Figure 4:
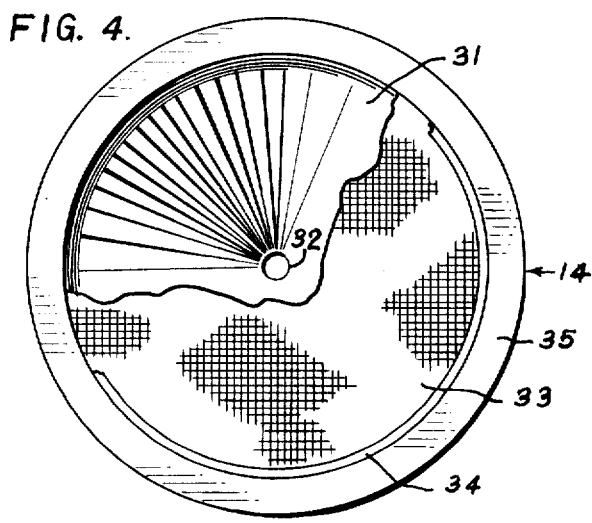
FIG. 4 is a top plan view of the brewer, with the screen partially sectioned.
Figure 5:
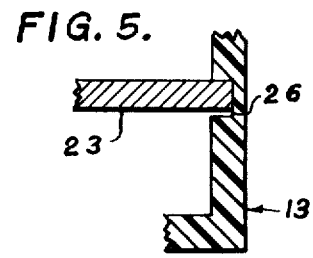
FIG. 5 is a partial sectional view taken on the lines 5—5 in FIG. 2 looking in the direction of the arrows.
Figure 6:
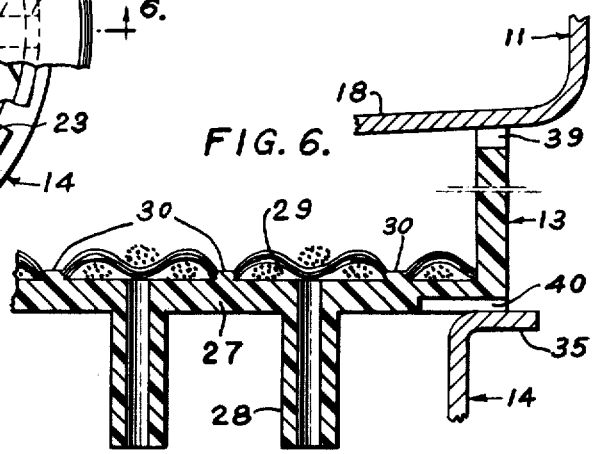
FIG. 6 is a partial sectional view taken on the line 6—6 in FIG. 2 looking in the direction of the arrows.
Figure 7:
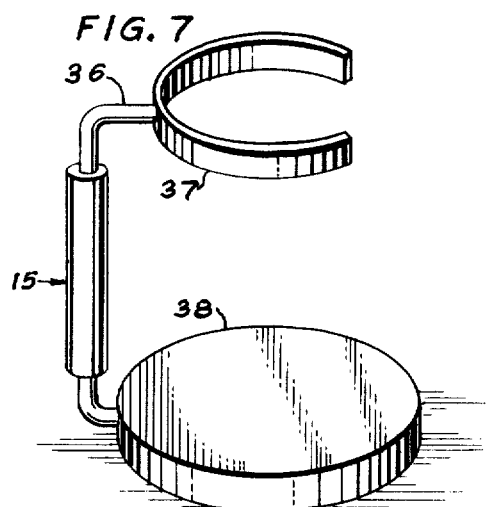
FIG. 7 is a perspective view of the stand for holding the beverage maker.

The beverage maker has four separate parts: a hot water reservoir 11, a rotatable selector 12, a distributor 13 and a brewer 14. A stand 15 is shown but it is no part of the invention. The cup 16 is provided to receive the brewed beverage.

Referring first to the reservoir 11, this is a generally cylindrical tank 17 having a floor 18 and a lid 19. The reservoir 11 is preferably made of metal, although other substances such as ceramic, glass, or plastic materials may be utilized. The selector plate 12 is rotatably attached to the reservoir 11 by a rivet 20. Intervening between the selector plate 12 and the bottom 18 of the reservoir is a spacer 21. The spacer 21 may be formed integrally with (or separate from) the selector plate 12. The spacer 21 is attached to the selector plate 12 and revolves with it. The spacer 21 and the selector plate 12 have a plurality of discharge orifices 22. The orifices in the selector plate 12 and the spacer 21 are in registration with each other. The selector plate is rotatable by the adjustment arms 23. In the floor 18 of the reservoir 11 there is a discharge port 24. By reason of rotation of the selector plate 12, the orifices 22 (of which there are five of different sizes) may be brought into registration with the discharge port 24 so that the rate of discharge from the reservoir 11 can be regulated. To provide for the rotation of the spacer 21 and the selector plate 12 with their respective orifices 22 in registration with each other, a pin 25 engages them together.

Hot water discharged from the reservoir 11 through the port 24 passes through the selected hole 22 which is in registration with the orifice 24, and reaches a distributor 13. The selector plate 12 is provided with four radial adjustment arms 23 which are snap-fitted into niches 26 in the distributor. The distributor 13 is made of plastic material so that it may be deformed or deflected to receive the adjustment arms 23. By rotating the distributor 13 with respect to the reservoir 11 when the two are engaged together by the arms 23 positioned in the niches 26, the selection of an appropriate flow orifice 22 can be made. The deflectable plastic material of which the distributor 13 is made is preferably polypropylene although there are other resilient plastic materials or metals that may be used.

The distributor 13 is provided with a floor 27 having a plurality of nozzles 28 for discharging fluid from the distributor 13 into the brewer 14. Lying on the floor 27 of the distributor 13, there is positioned a woven or unwoven cloth sheet 29 capable of penetration by water, also of polypropylene or metal. This cloth sheet 29 is fused or welded to the floor 27 on a plurality of lines 30 which define distribution areas related to the nozzles 28. The fusion lines 30 define a separate distribution area for each of the nozzles 28. The cloth 29 is provided with interstices of such dimension as to regulate the liquid in the distributor 13 from flowing too rapidly into the brewer 14. It has been found that multifilament fabric of 60 × 36 twill, 8.7 oz. per square yard has been suitable but the variations of the character of such fabric are so numerous that the exact nature of the fabric has to be determined by test. The use of the fabric layer 29 is merely to provide a regulated flow of fluid through the nozzles 29, and other porous materials may be substituted.

The distributor 13 rests on the brewer 14. The brewer is a generally tubular body having a floor 31 which is deformed downwardly toward a discharge orifice 32 which is axially located in the brewer 14. A stainless steel screen or mesh 33 defines a suspended floor in the brewer 14, which is spaced away from the bottom 31. Other mesh material may be used. The screen 33 may be soldered to a ring 34 which may be press-fitted into the bottom of the brewer 14. If it is desired, the ring 34 may be merely such as to frictionally engage the brewer 14 at its internal wall near the bottom, so as to tautly maintain the screen 33, in spaced relation to the bottom 31. The brewer 14 is provided with an external flange 35. The holder 15 has an arm 36 which terminates in a semi-circular support 37 which will be engageable and disengageable with the brewer 14. Upon the semi-circular support 37, the flange 35 is seated. A cup 16 can stand on the base 38 of the stand 15, so as to receive the brewed contents as they flow from the brewer 14.

The operation of the device is as follows. The distributor 13 is disengaged from the brewer 14, and a quantity of coffee is deposited upon the screen 33 in amounts suitable to provide a brew of the desired strength. The distributor 13 is then placed upon the brewer 14 and the reservoir rotated to bring the desired holes 22 in registration with the discharge port 24 to regulate appropriately the flow of hot water from the reservoir 11. Hot water is placed in the reservoir 11 and it flows into the distributor 13. The hot water flows across the floor 29 and out of the nozzles 28 into the brewing chamber 14. In this chamber, the ground coffee and the stainless steel mesh 33 restrain the rapid discharge of the hot water and keep it in contact with the coffee that has been deposited in the brewer 14 sufficiently long until the coffee essence is extracted, and the hot water passes through the mesh 33 and out of the discharge port 32 into the cup 16. Adjustment of the selector plate 12 to any of the five chosen positions provides a precise water flow control to determine the strength of the coffee essence from the coffee deposited in the brewer 14. The beverage maker is readily operated, easily cleaned, and consistently produces a brew of preferred strength on each successive operation wherein the same rates of flow are provided for, and the same amount of coffee is deposited in the brewing chamber 14.

The stainless steel mesh size is not critical because the resistance to the flow of hot water is not dependent entirely upon the mesh, but is most particularly dependent upon the coffee in the reservoir 14. A stainless steel mesh of approximately 200 to 325 interstices per linear inch has been found to be satisfactory and is preferred.

For the relief of entrapped air and to provide for a free flow of hot water from the reservoir 11 into the distributor 13 and into the brewer 14, air relief vents 39, 40 may be provided in the top of the distributor 13, and in the bottom of the distributor 13. A mark 41 and a plurality of marks 42 respectively on the reservoir 11 and the distributor 13 are provided to indicate which of the plurality of varying size holes 22 have been selected for regulating the flow.

What is claimed is:

1. A beverage maker comprising:
   a. a brewing chamber,
   b. a conical floor in the brewing chamber,
   c. a discharge port in the floor,
   d. a generally flat support screen disposed across the brewing chamber in spaced relation to the conical floor,
   e. a distributor chamber superposed on the brewing chamber,
   f. a generally flat floor in the distributor chamber,
   g. a plurality of generally tubular nozzles defining projecting spouts on the bottom floor of the distributor chamber communicating from the interior of the distributor chamber to the interior of the brewing chamber, whereby liquid in the distributor chamber is uniformly and completely discharged from the distributor chamber,
   h. a sheet capable of penetration by liquid, attached to the floor of the distribution chamber over the top of the nozzles,
   i. lines on the sheet defining separate liquid distribution areas for each nozzle,
   j. a liquid reservoir superposed on the distribution chamber,
   k. a discharge port in the bottom of the reservoir,
   l. a selector plate rotatably attached to the bottom of the reservoir,
   m. radial arms on the selector plate,
   n. the arms affirmatively engageable with the distribution chamber,
   o. a plurality of holes of graduated size in the selector plate,
   p. the holes in the selector plate positioned for successive registrations with the discharge port in the floor of the brewing chamber,
   q. the selector plate rotatable with the distributor to successively bring a preselected hole in the selector plate into registration with the discharge port.

* * * * *